March 19, 1957 — R. BARROS — 2,785,547
ICE-CONTAINING RECEPTACLE APPLICABLE TO MIXING MACHINES
Filed May 10, 1955

INVENTOR:
Ramon Barros
BY A. John Michel
ATTORNEY

United States Patent Office 2,785,547
Patented Mar. 19, 1957

2,785,547

ICE-CONTAINING RECEPTACLE APPLICABLE TO MIXING MACHINES

Ramon Barros, Buenos Aires, Argentina

Application May 10, 1955, Serial No. 507,290

5 Claims. (Cl. 62—149)

The present invention refers to comminuting machines, and more particularly to an ice-containing receptacle in such machines.

The difficulties encountered with comminuting machines having rotating cutting blades are well-known, particularly when such machines are used to prepare fruit juices and other drinks to be consumed cold; in such cases a certain quantity of granulated or finely crushed ice must be prepared beforehand and is charged into the mixing jar or container before or during comminution.

When the machine is in operation, the very fast rotational speed of the cutting blades causes the latter to collide violently with the pieces of ice and are thus quickly blunted; they can even be broken, as well as the container itself, particularly when the ice has not been properly comminuted.

It is the principal object of the present invention to overcome these difficulties by providing a receptacle for holding the ice in large pieces, said receptacle being suspended inside the mixing jar and keeping the ice totally removed from the blades.

By keeping the cooling agent removed from the rotating blades and thus preventing said cooling agent from colliding with the blades, the receptacle makes it feasible to employ ice cubes as cooling agent, or ice in larger pieces, in accordance with the capacity of said receptacle, making it unnecessary to crush ice beforehand.

The invention likewise envisages other accessory objects, as will be made clear during the course of the present description.

In order that the present invention may be more clearly understood and readily put into practice, it will now be described with particular reference to two embodiments preferred for illustrative examples and shown in the attached drawings, in which.

Like numerals represent like or similar parts throughout the several figures of the drawing.

Figures 1, 2, 3:
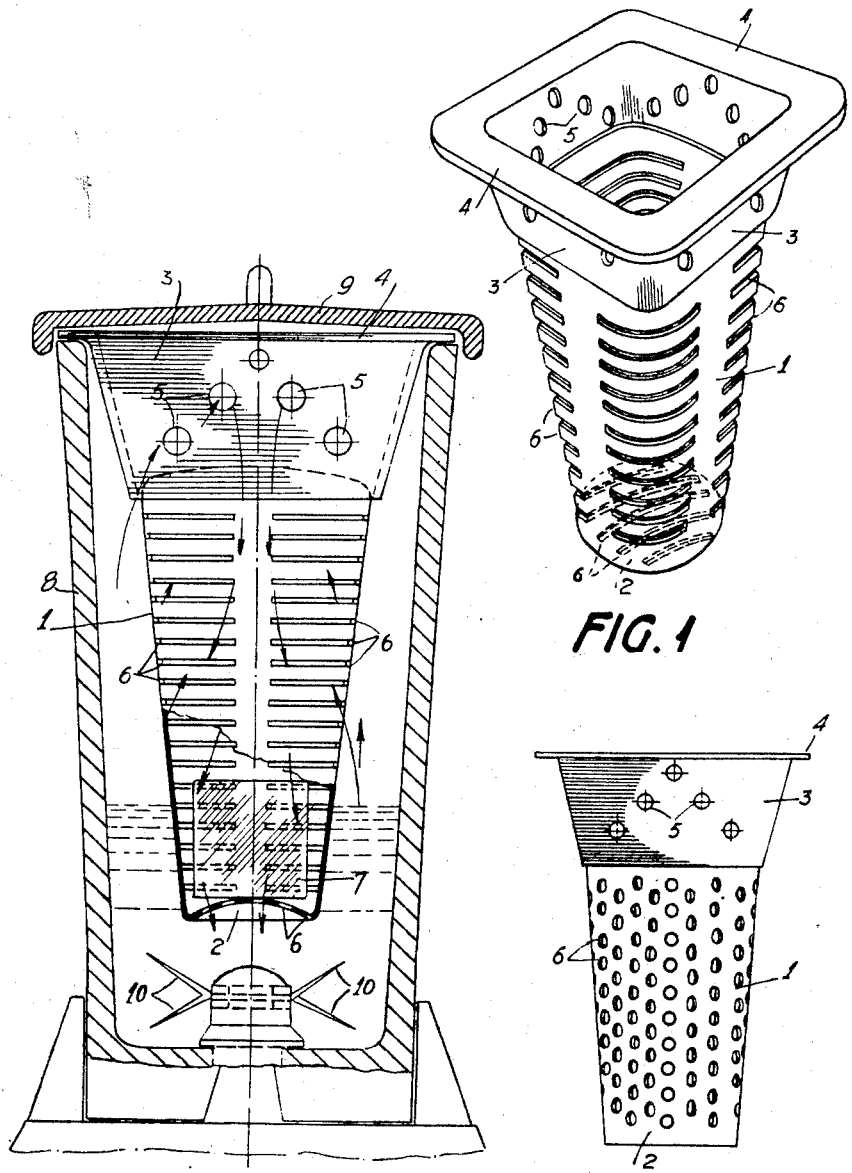
Figure 1 is a perspective view of the ice-containing receptacle according to the invention, in one of its preferred embodiments.
Figure 2 is a diagrammatic side view, illustrating a further embodiment of the receptacle according to the invention.
Figure 3 is a diametral section illustrating the manner of placing the receptacle in a mixing jar, the receptacle being partially shown in section.

In the embodiment shown, the receptacle consists essentially of a lower body 1, preferably having the shape of a truncated-cone, closed at its lower portion by a bottom 2. The upper edge of this receptacle is integrally connected to a neck 3, the top of which is provided with a horizontal flange 4. The entire assembly can be made of metal and/or plastic material and/or any other convenient stiff material.

The figures furthermore show that said neck 3 is provided with small suitably spaced openings 5.

Lower body 1, in turn, is provided at its sides and bottom 2 with openings 6, which may be narrow longitudinal slits, as shown in Figure 1, or small-diameter, circular orifices, as shown in Figure 2 and covering all or part of the aforesaid surfaces.

The receptacle described is provided to contain pieces of ice 7 or other refrigerant medium.

Once the fruit or other substances to be liquefied are placed within jar 8, the same—as is usual—are subjected to the action of the rotating blades, in very little liquid. Immediately thereafter, the ice-containing receptacle according to the invention is arranged inside the liquator jar, the upper edge of which serves to seat flat flange 4. The parts being arranged in this manner, the pieces of ice or ice cubes are introduced into the receptacle of the invention, additional liquid being then added to the contents of the jar. The mixer is then once more put into operation, after placing the cover 9 on the jar (said top or cover may be omitted, as it is not absolutely necessary).

During rotational movement of the comminuting blades 10, and as a consequence of the slanting position of the same, the liquated matter is driven upwards through the space left between the lateral surface of receptacle 1 and the liquator jar 8, passing through orifices 5 of neck 3 and slits 6 of the lower body, descending inside said receptacle 1 as shown by the arrows of Figure 3, and thus coming in contact with ice cubes 7. The cooled and liquefied matter leaves said receptacle 1 through slits or orifices 6 provided in the lower portion of said receptacle and bottom 2. In this manner, a continuous uninterrupted current of liquid is set up through the cooling agent.

The convex shape of bottom 2 is provided to keep ice cubes 7 somewhat spaced from said bottom to avoid closing up of the orifices in the bottom of said receptacle.

As said before, the receptacle according to the invention keeps ice cubes 7 totally removed from cutter blades 10, thus preventing any possible wear or breakage thereof by colliding with the ice. As a consequence thereof, ice cubes or more or less large pieces of ice (7) may be used, according to the capacity of said receptacle.

It is evident that sundry changes in construction and detail may be introduced without thereby departing from the scope of this invention, as clearly defined in the following claims.

I claim:

1. In combination with a mixing jar having at its bottom rotatable cutting blades for comminuting matter charged into the jar: a receptacle for holding a particulate cooling medium, said receptacle comprising a main body having the shape of an inverted truncated cone, a convex bottom, said bottom being spaced from said cutting blades, and a neck portion having more sharply tapered walls than the main body, the main body, bottom and neck portion having spaced apertures therein for free passage of liquid into and out of the receptacle, and flange means connected to said neck portion for supporting the receptacle in said jar.

2. The combination of claim 1, wherein the apertures in the neck portion are of larger diameter than the apertures in the main body and bottom.

3. The combination of claim 1, wherein the apertures in the main body are formed by a plurality of rows of rectangular slits.

4. The combination of claim 1, wherein the apertures in the main body are formed by a plurality of circular holes.

5. The combination of claim 1, wherein the convex bottom is a spherically shaped cap.

References Cited in the file of this patent

UNITED STATES PATENTS

| | | |
|---|---|---|
| 527,711 | Nelson | Oct. 16, 1894 |
| 1,432,888 | Murray | Oct. 24, 1922 |
| 2,168,969 | Bickerstaff | Aug. 8, 1939 |